(12) United States Patent
Carlson

(10) Patent No.: US 10,072,514 B2
(45) Date of Patent: Sep. 11, 2018

(54) METHOD AND APPARATUS FOR ATTACHING A TRANSITION DUCT TO A TURBINE SECTION IN A GAS TURBINE ENGINE

(71) Applicant: Siemens Energy, Inc., Orlando, FL (US)

(72) Inventor: Andrew Carlson, Jupiter, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 948 days.

(21) Appl. No.: 14/333,725

(22) Filed: Jul. 17, 2014

(65) Prior Publication Data

US 2016/0017730 A1    Jan. 21, 2016

(51) Int. Cl.
*F01D 9/02* (2006.01)
*F01D 25/24* (2006.01)
*F02C 7/20* (2006.01)
*F23R 3/60* (2006.01)

(52) U.S. Cl.
CPC ........... *F01D 9/023* (2013.01); *F01D 25/243* (2013.01); *F02C 7/20* (2013.01); *F23R 3/60* (2013.01); *F05D 2230/60* (2013.01); *F05D 2230/644* (2013.01); *F05D 2240/90* (2013.01); *F05D 2260/31* (2013.01)

(58) Field of Classification Search
CPC ........ F01D 9/023; F01D 25/243; F01D 25/28; F01D 25/246; F01D 11/005; F02C 7/20; F05D 2240/90; F05D 2240/91; F05D 2230/644; F05D 2260/31; F05D 2230/60; F23R 3/60
See application file for complete search history.

(56) References Cited

U.S. PATENT DOCUMENTS

| | | | | |
|---|---|---|---|---|
| 3,700,292 A | * | 10/1972 | Owens | B23Q 1/0063 384/9 |
| 3,965,066 A | * | 6/1976 | Sterman | F01D 9/023 415/115 |
| 4,146,261 A | * | 3/1979 | Edmaier | F01D 25/243 285/364 |
| 4,650,396 A | * | 3/1987 | Schwarz | F01D 25/243 403/374.3 |
| 5,291,732 A | * | 3/1994 | Halila | F23R 3/60 60/752 |

(Continued)

FOREIGN PATENT DOCUMENTS

| | | | | |
|---|---|---|---|---|
| DE | 4324035 A1 | * | 1/1995 | ............ F01D 9/023 |
| JP | 2003193866 A | * | 7/2003 | ............... F02C 7/28 |

*Primary Examiner* — Gerald L Sung
*Assistant Examiner* — Alain Chau

(57) ABSTRACT

An apparatus for attaching a transition duct to a turbine section of a gas turbine engine includes an annular shaped vane carrier that engages with a transition aft frame. The transition aft frame includes an outwardly extending clamp that is at least partially inserted into a radial recess of the vane carrier structure. A spacer is inserted into the recess. A first pair of mating surfaces is formed by a first end face of the spacer and an end face of the clamp and a second pair of mating surfaces is formed by a second end face of the spacer and a wall of the recess. At least one of the pairs of mating surfaces is inclined at an angle with respect to a radial plane of the vane carrier structure. A retention device secures the spacer to the vane carrier structure.

15 Claims, 3 Drawing Sheets

(56) References Cited

U.S. PATENT DOCUMENTS

| | | | |
|---|---|---|---|
| 5,414,999 A | 5/1995 | Barnes | |
| 5,761,898 A | 6/1998 | Barnes et al. | |
| 6,099,198 A * | 8/2000 | Kotzur | F01D 25/243 |
| | | | 403/367 |
| 6,347,508 B1 * | 2/2002 | Smallwood | F01D 9/023 |
| | | | 60/796 |
| 7,908,866 B2 * | 3/2011 | Kato | F01D 9/023 |
| | | | 60/752 |
| 8,240,045 B2 | 8/2012 | Sutcu et al. | |
| 9,702,258 B2 * | 7/2017 | Mayer | F01D 25/28 |
| 2006/0123797 A1 * | 6/2006 | Zborovsky | F01D 9/041 |
| | | | 60/800 |
| 2008/0159860 A1 * | 7/2008 | Cortequisse | F01D 25/243 |
| | | | 415/214.1 |
| 2013/0111910 A1 | 5/2013 | DiCintio et al. | |
| 2015/0240724 A1 * | 8/2015 | Low | F01D 9/023 |
| | | | 60/722 |
| 2017/0268355 A1 * | 9/2017 | Kumar | F01D 9/023 |

* cited by examiner

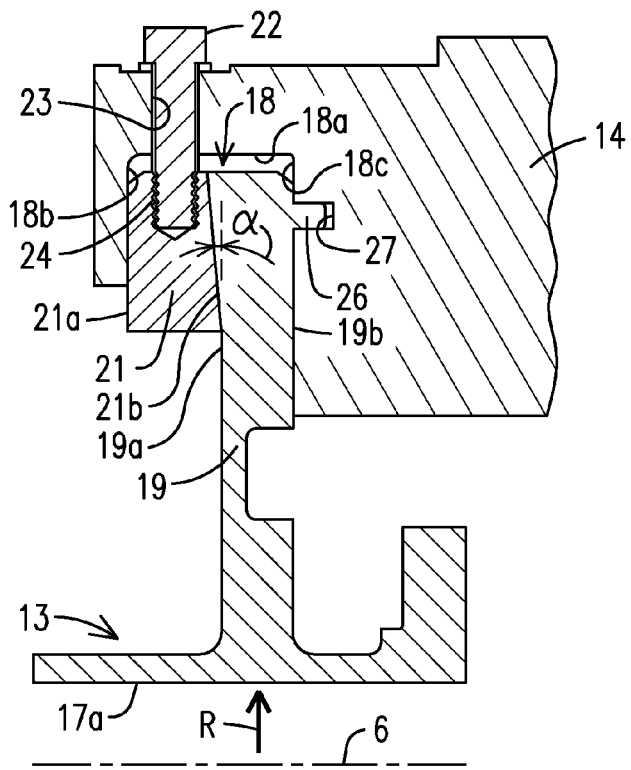
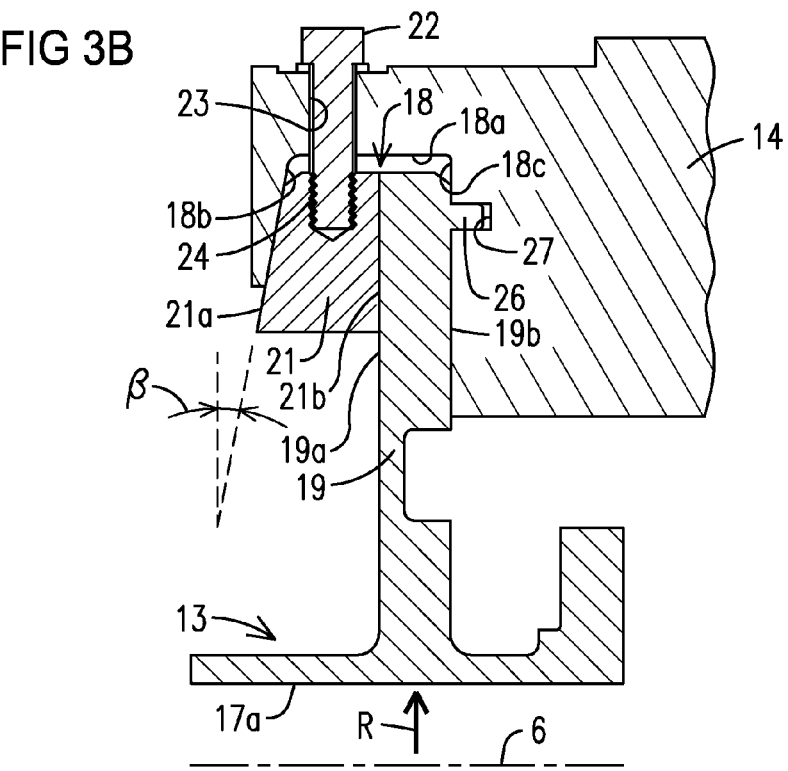

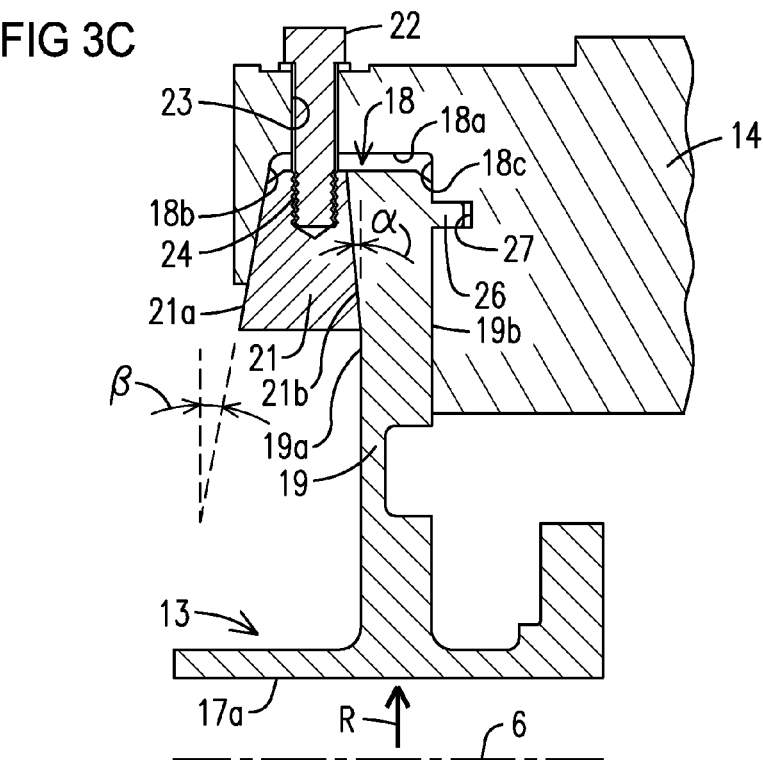
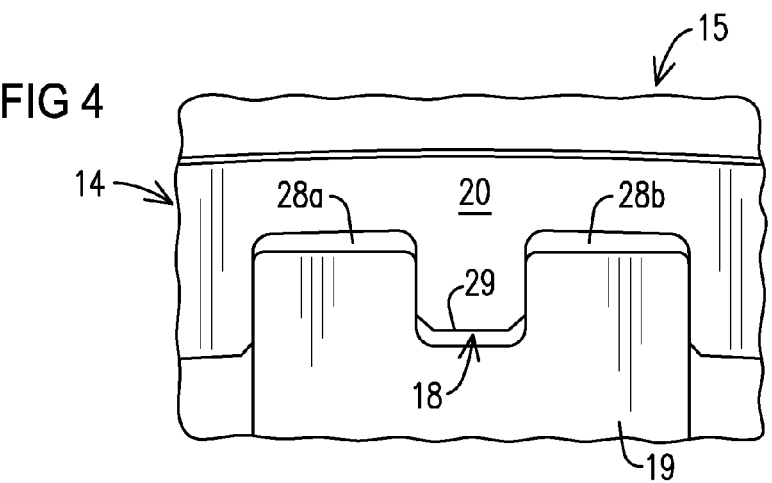
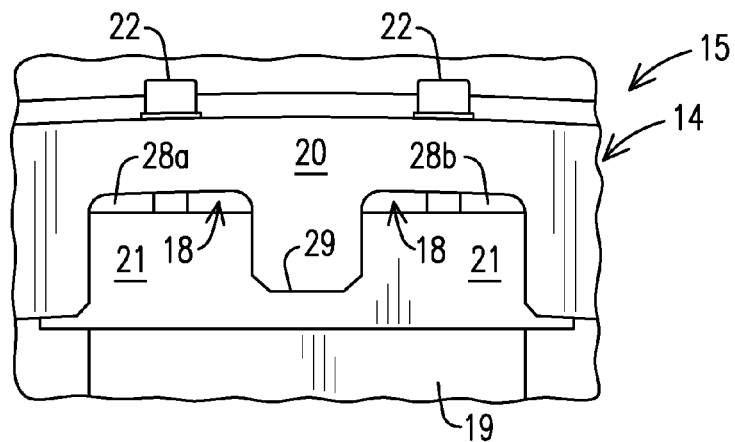

METHOD AND APPARATUS FOR ATTACHING A TRANSITION DUCT TO A TURBINE SECTION IN A GAS TURBINE ENGINE

BACKGROUND

1. Field

Embodiments of the present invention relate generally to gas turbine engines, and in particular, to a method and apparatus for attaching a transition duct to a turbine section in a gas turbine engine.

2. Description of the Related Art

A conventional gas turbine engine includes a compressor section, a combustion section including a plurality of combustors, and a turbine section. Ambient air is compressed in the compressor section and conveyed to the combustors in the combustion section. The combustors combine the compressed air with a fuel and ignite the mixture creating combustion products defining hot working gases that flow in a turbulent manner and at a high velocity. The working gases are routed to the turbine section via a plurality of transition ducts. Within the turbine section are rows of stationary vane assemblies and rotating blade assemblies. The rotating blade assemblies are coupled to a turbine rotor. As the working gases expand through the turbine section, the working gases cause the blades assemblies, and therefore the turbine rotor, to rotate. The turbine rotor may be linked to an electric generator, wherein the rotation of the turbine rotor can be used to produce electricity in the generator.

The transition ducts are positioned adjacent to the combustors and route the working gases from the combustors into the turbine section through turbine inlet structure associated with a first row vane assembly. The vane assembly is mounted on an annular vane carrier. The transition duct comprises an aft frame defining a transition exit that opens into the gas turbine section.

A transition duct may be assembled on the aft side by fastening the transition aft frame to the vane carrier. For this purpose, the forward face of the vane carrier contains axially extending threaded holes or holes comprising threaded inserts, spaced appropriately to align with the transition aft frame. The transition aft frame is then bolted to the vane carrier.

However, providing threaded features in the vane carrier may negatively affect the life of vane carrier as the threads tend to wear off over time particularly due to repeated servicing of the parts. Also, removal and replacement of threaded inserts during service can be time consuming and have an adverse effect on overall outage time.

SUMMARY

Briefly, aspects of the present invention provide a method and apparatus for attaching a transition duct to a turbine section in a gas turbine engine.

In a first aspect, an apparatus is provided for attaching a transition duct to a turbine section of a gas turbine engine. The apparatus comprises an annular shaped vane carrier structure comprising a radial recess, and a transition aft frame that engages with the vane carrier structure. The transition aft frame comprises an outwardly extending clamp that is at least partially inserted into the recess. A spacer is inserted into the recess whereby the clamp and the spacer are arranged axially adjacent to each other within the recess. A first pair of mating surfaces is formed by a first end face of the spacer and an end face of the clamp and a second pair of mating surfaces is formed by a second end face of the spacer and a wall of the recess. The first pair and/or second pair of mating surfaces are inclined at an angle with respect to a radial plane of the vane carrier structure. A retention device is provided for securing the spacer to the vane carrier structure.

In a second aspect, a method is provided for attaching a transition duct to a turbine section of a gas turbine engine. The method includes engaging a transition aft frame comprising an outwardly extending clam with an annular shaped vane carrier structure, such that the clamp is at least partially inserted into a radial recess provided in the vane carrier structure. The method further includes inserting a spacer into the recess whereby the clamp and the spacer are arranged axially adjacent to each other within the recess. A first pair of mating surfaces is formed by a first end face of the spacer and an end face of the clamp and a second pair of mating surfaces is formed by a second end face of the spacer and a wall of the recess. The first pair and/or second pair of mating surfaces are inclined at an angle with respect to a radial plane of the vane carrier structure. The method further includes securely fastening the spacer to the vane carrier structure.

In a third aspect, a gas turbine engine is provided. The gas turbine engine includes a combustor section for producing a working medium by combustion of a mixture of fuel and an oxidant, a turbine section located downstream of the combustor section for expanding the working medium, and a transition duct arranged fluidically between the combustor section and the turbine section. The transition duct directs the working medium from the combustor section to a first row of stationary vanes arranged on an annular vane carrier structure in the turbine section. The transition duct is attached to the gas turbine structure by the method and apparatus disclosed above.

BRIEF DESCRIPTION OF THE DRAWINGS

The invention is shown in more detail by help of figures. The figures show preferred configurations and do not limit the scope of the invention.

FIG. 3A illustrates a sectional view along the section line III-III of FIG. 2 in accordance with a first embodiment, FIG. 3B illustrates a sectional view along the section line III-III of FIG. 2 in accordance with a second embodiment, FIG. 3C illustrates a sectional view along the section line III-III of FIG. 2 in accordance with a third embodiment, FIG. 4 an enlarged forward end view of the exemplary apparatus of FIG. 2 with the spacer uninstalled while axial assembly is retained, and FIG. 5 illustrates an enlarged forward end view of the exemplary apparatus of FIG. 2 when the spacer has been installed.

DETAILED DESCRIPTION

Embodiments of the present invention illustrated herein provide a method and apparatus for attaching a transition duct to the turbine section of a gas turbine engine. The illustrated embodiments provide mechanical interlocking features that may be machined into the turbine vane carrier and the transition aft frame, whereby threaded features in the turbine vane carrier may be obviated. The existing state of the art employs a threaded feature in a turbine vane carrier, which is a high-cost component. The illustrated embodiments employ a threaded spacer, which may be an expendable low-cost component.

As used in this Specification, the terms "forward" and "aft" are defined in relation to the direction of flow of the working medium, wherein forward refers to a relative upstream position and aft refers to a relative downstream position.

Figure 1:
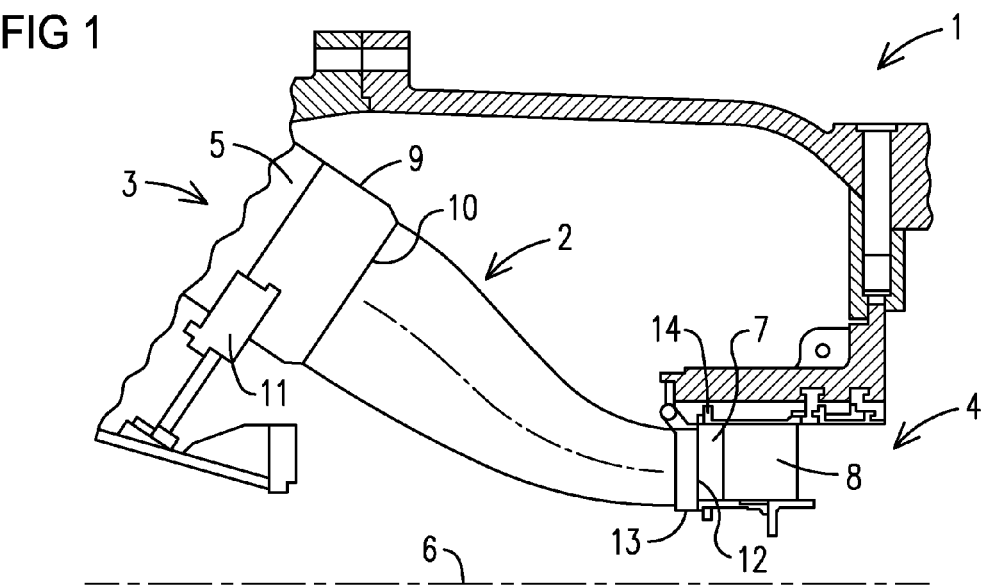
FIG. 1 illustrates a side elevation view of a portion of a gas turbine engine including a transition duct extending from a combustor to the entrance to a turbine section, in accordance with one embodiment.

Referring to FIG. 1, a portion of a gas turbine engine 1 is illustrated, including a transition duct 2 extending from a combustor section 3 to the entrance of a turbine section 4. The combustor section 3 may include, for example, a plurality of combustors 5 arranged in a circular arrangement about a turbine axis 6. Only one such combustor 5 is shown in FIG. 1. Each combustor 5 comprises a combustion zone wherein a working medium is produced by combustion of a mixture of fuel and an oxidant, such as compressed air from a compressor section (not shown) of the gas turbine engine 1. Each combustor 5 has a respective transition duct 2 attached thereto that provides a conduit for conveying the working medium comprising hot combustion gases from the combustor 5 to the entrance 7 of a turbine assembly, where the gases are directed toward a first row of stationary vanes 8 arranged on an annular shaped vane carrier structure 14, also referred to as a casing or turbine vane carrier (TVC). An inlet ring 9 may be provided at an inlet end 10 of the transition duct 2. The inlet ring 9 may have, for example, a generally circular cross-section. The inlet ring 9 may be supported by an inlet support 11. An outlet end 12 of the transition duct 2 may include a transition aft frame 13. In the illustrated example, the aft frame 13 has a generally rectangular or trapezoidal arc-like shape. The transition duct 2 in this example has a geometric profile that transitions from a generally circular cross-section, substantially corresponding to the shape of the outlet from the combustor 5, to a generally trapezoidal or rectangular arc-like cross-section at the turbine entrance 7, while also defining a radially inwardly extending path for the gas flow. The transition duct 2 is attached to the turbine section 4 by fastening the transition aft frame 13 to the vane carrier structure 14. The transition aft frame 13 may be cast together with the transition duct 2, or may be manufactured separately and welded to the transition duct at the outlet end.

Figure 2:
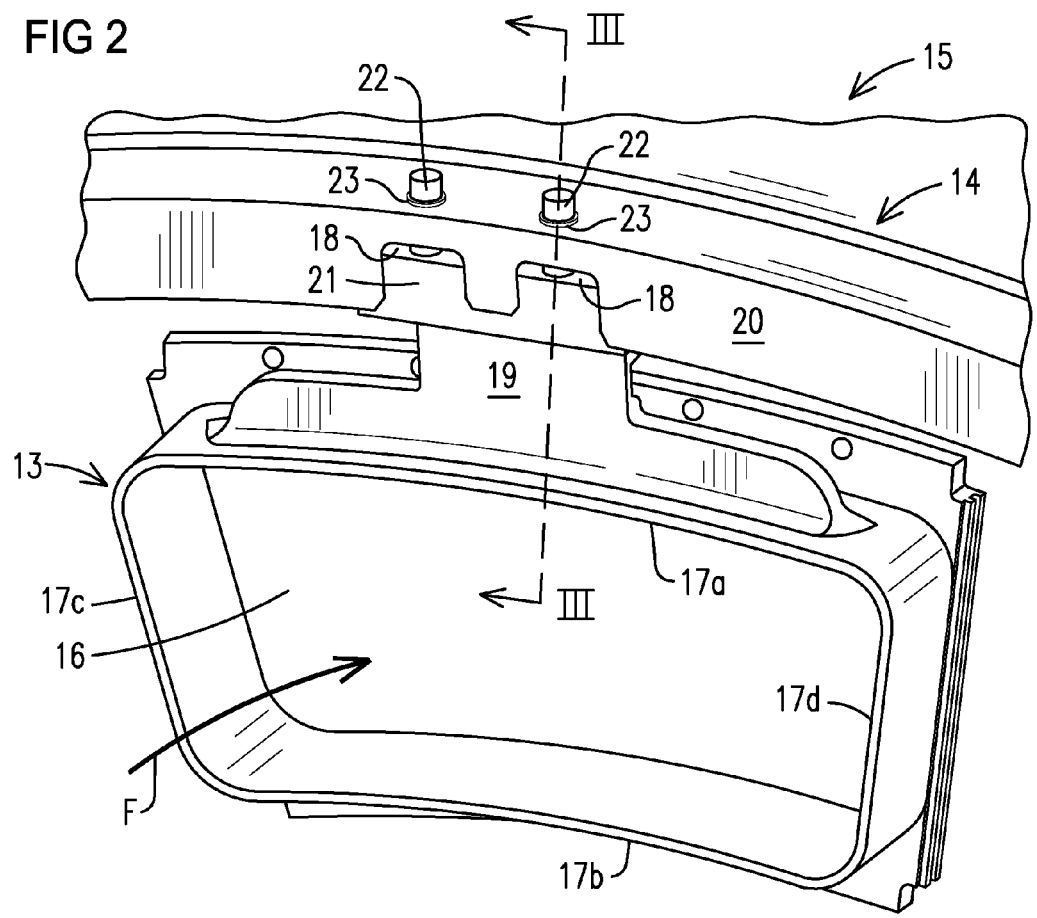
FIG. 2 illustrates a perspective forward end view of a transition aft frame that is engaged with vane carrier structure, in accordance with one embodiment.

FIG. 2 illustrates a perspective view of an apparatus 15 for attaching a transition duct to a turbine section of a gas turbine engine, including a transition aft frame 13 that is engaged with vane carrier structure 14, in accordance with an embodiment of the present invention. FIG. 3A-3C illustrate sectional views along the section line III-III in FIG. 2 in accordance with various embodiments.

The illustrated transition aft frame 14 comprises a four-sided body that defines a manifold 16 that opens into the turbine section 4. The flow direction of the working medium is indicated by the arrow F. The four-sided body is formed by an outer radial wall 17a, and inner radial wall 17b and side walls 17c and 17d. In accordance with the illustrated embodiments, the gas turbine engine 1 is provided with a can-annular configuration. In such a case the four-sided body may have, for example, a curvilinearly (or arc-like) trapezoidal shape, as shown in FIG. 2 The curvilinearly trapezoidal shape is characterized in that the sidewalls 17c, 17d oppose one another and are substantially straight. The outer and inner walls 17a, 17b extend between the sidewalls 17c, 17d and similarly oppose one another. The outer and inner radial walls 17a, 17b exhibit curvatures corresponding to the overall radial curvature of the can-annular configuration. On the outer radial wall 17a, a clamp or flange 19 is provided, that extends in a radially outward direction.

The vane carrier structure 14 has a generally annular shape and comprises a recess 18 to receive the outwardly extending clamp 19 of the transition aft frame 13. In the illustrated embodiment, the recess 18 is machined into a forward face 20 of the vane carrier structure 14, i.e., the face of the vane carrier structure facing the flow F of the working medium.

Referring, in particular, to FIG. 3A, it is seen that the recess 18 is a radial recess. That is to say, the recess 18 extends at least in a radial direction R. A radial direction is understood to be a direction perpendicular to the turbine axis 6. An axial direction is understood to be a direction along or parallel to the turbine axis 6. The recess 18 is defined by a floor 18a flanked on axially opposite ends by a pair of walls, namely a forward wall 18b and an aft wall 18c. The floor 18a delimits the radially outwardly extent of the recess 18, while the walls 18b, 18c delimit the axial extent of the recess 18.

The clamp 19, or a portion thereof, is inserted into the recess 18. In this example, the transition aft frame 13 may be assembled axially such that the clamp 19 is inserted within the recess 18. The clamp 19 has two opposing faces, namely a forward face 19a and an aft face 19b. In this example, the clamp 19 is inserted such that the aft face 19b of the clamp 19 engages with the aft wall 18c of the recess 18. In other embodiments (not shown), the forward face 19a of the clamp 19 may engage with the forward wall 18b of the recess 18.

In accordance with the illustrated embodiments, a spacer 21 is also inserted radially into the recess 18 such that the spacer 21 and the clamp 19 are arranged axially adjacent to each other within the recess 18. In the illustrated example, the spacer 21 is in a forward position with respect to the clamp 19. In other embodiments (not shown), the arrangement may be reversed whereby the spacer 21 may occupy an aft position with respect to the clamp 19 within the recess 18.

The spacer 21 has a pair of end faces, namely a forward end face 21a and an aft end face 21b. As shown in FIG. 3A, the end faces 21a and 21b are inclined to each other (i.e., not parallel), whereby the spacer 21 has the shape of a wedge. One of the end faces of the spacer 21, in this example, the aft end face 21b, engages with an end face of the clamp 19, in this case the forward end face 19a, to form a first pair of mating surfaces. The other end face of the spacer 21, in this example, the forward end face 21a engages with the face of one of the walls of the recess 18, in this case the forward wall 18b, to form a second pair of mating surfaces.

In the context of this Specification, a pair of mating surfaces is defined as a pair of contacting surfaces that are parallel to each other, whereby a frictional relationship is established between the mating surfaces.

In accordance with the illustrated embodiments, at least one of the above mentioned pairs of mating surfaces is inclined with respect to a radial plane. A radial plane is understood to be a plane that is perpendicular to the turbine axis 6. In the embodiment of FIG. 3A, the first pair of mating surfaces 21b, 19a is shown to be inclined at an angle $\alpha$ with respect to the radial plane. The spacer 21 is securely fastened to the vane carrier structure 14 by a retaining device, such as one or more retention bolts 22. In the illustrated example, the retention bolt 22 is housed in a radial clearance hole 23 in the vane carrier structure 14. The wedge shaped spacer 21 is provided with internal threading 24 that engages with the respective retention bolt 22. In the embodiment shown in FIG. 2, the two retention bolts 22 are provided that are spaced circumferentially apart. Because of the inclined mating surfaces, an axial retention is achieved by the wedge shaped spacer 21 which imposes an axial load on the clamp 19 of the transition aft frame 13 when the retention bolts 22 are tightened. The angle α is determined taking into account several factors. For example, if the value of α is too high, it leads to reduced axial loads. On the other hand, if the value of α is too small, the wedge shaped spacer 21 may tend to get stuck in the recess 18 due to the combination of axial loads and frictional forces. In the illustrated embodiment, the angle α lies in the range of 3° to 10°, in particular, about 5°.

In the embodiment of FIG. 3A, the first pair of mating surfaces 21b, 19a is shown to be inclined at an angle α with respect to the radial plane while the second pair of mating surfaces 21a, 18b is shown to be parallel to the radial plane. FIGS. 3B and 3C depict alternate possibilities. FIG. 3B-3C are similar to FIG. 3A in every respect except for the inclination of the mating surfaces and description of the same parts will not be repeated. In the embodiment shown in FIG. 3B, the second pair of mating surfaces 21a, 18b is shown to be inclined at an angle β with respect to the radial plane while the he first pair of mating surfaces 21b, 19a is parallel to the radial plane. In the embodiment shown in FIG. 3C, both the first and second pairs of mating surfaces are inclined at respective angles α and β with respect to the radial plane. The angles α and β may be determined, for example, taking into consideration the axial loads and/or frictional forces, and may have same or different values from each other.

In the illustrated embodiments, the aft face 19b of the clamp 19 mates with the aft wall 18c of the recess 18. The aft face 19b of the clamp 19 is provided with a protrusion 26 that engages with a corresponding groove 27 provided on the aft wall 18c of the recess 18. A radial spigot feature is hereby realized that provides a radial constraint to the transition aft support frame 13. In an alternate embodiment, the arrangement may be reversed wherein a protrusion may be provided on the aft wall 18c of the recess 18 while a corresponding groove may be provided on the aft face 19b of the clamp 19. In still other embodiments, the forward face 19a of the clamp 19 may engage with the forward wall 18b of the recess 18 and a radial spigot feature may be realized by providing a protrusion on one of the faces 18b or 19a and a groove on the other.

FIG. 4 illustrates an enlarged forward end view of the exemplary apparatus 15 with the spacer uninstalled while axial assembly is retained. FIG. 5 illustrates a corresponding view with the spacer installed. As shown in the illustrations, the recess 18 has a circumferential contour extending along a circumferential direction of the vane carrier structure, that comprises at least a pair of valleys 28a, 28b delimiting a radially outward extent of the recess 18. The valleys 28a, 28b are interspaced by a radially inwardly projecting tang 29. The resultant contour resembles a so-called dog-ear shape. The central tang 29 of the dog-ear shaped recess 18 provides a circumferential constraint of the transition aft frame 13 to the vane carrier structure 14. The above-illustrated feature, when machined into the forward face 20 of the vane carrier structure 14 preserves the ability to assemble the transition aft frame 13 axially. The radially outer portion of the clamp 19 may have a shape that corresponds to the contour of the recess 18. The wedge shaped spacer 21 may be inserted radially after the transition aft frame is positioned axially.

The illustrated embodiments provide a mechanical interlocking feature realized by frictional forces between the inclined mating surfaces, and an axial retention realized by axial loads imposed by the retention bolts. Furthermore, a radial constraint for the transition aft frame may be afforded by the radial spigot feature machined into the turbine vane carrier. Additionally, a circumferential constraint may be afforded by having a radially inwardly projecting tang in the circumferential contour of the recess. Because the inventive concept does not rely on threaded holes in the turbine vane carrier but on frictional forces, it affords a circumferential degree of freedom for the transition aft frame. The position of the aft frame along the circumference of the turbine vane carrier may be adjusted by simply loosening the retention bolts, moving the transition aft frame to a desired circumferential position, and subsequently tightening the retention bolts.

The embodiments obviate the need for threaded holes in the turbine vane carrier and instead employ radial clearance holes in the turbine vane carrier that house the wedge spacer retention bolts. The threaded features are isolated to wedge shaped spacer, which is typically a low cost-expendable component. As a consequence, galled, seized, cross-threaded and broken bolts no longer result in repairs needed on the high cost, "permanent" component namely, the turbine vane carrier. The useful life of the turbine vane carrier is thereby increased. The embodiments may also reduce outage time if there are no threaded inserts in the turbine vane carrier to replace. The wedge shaped spacer is considered consumable and may simply be replaced with a new spacer during an overhaul.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

What is claimed is:

1. An apparatus for attaching a transition duct to a turbine section of a gas turbine engine, comprising:
    an annular shaped vane carrier structure comprising a radial recess,
    a transition aft frame that engages with the vane carrier structure, the transition aft frame comprising an outwardly extending clamp that is at least partially inserted into the recess,
    a spacer inserted into the recess whereby the clamp and the spacer are arranged axially adjacent to each other within the recess, wherein a first pair of mating surfaces is formed by a first end face of the spacer and an end face of the clamp and a second pair of mating surfaces is formed by a second end face of the spacer and a wall of the recess, wherein the first pair and/or second pair of mating surfaces are inclined at an angle with respect to a radial plane of the vane carrier structure,
    a retention device for securing the spacer to the vane carrier structure, the retention device comprising a radial retention bolt configured to apply an axial load on the clamp when tightened;
    wherein the recess has a circumferential contour that comprises at least a pair of valleys delimiting a radially outward extent of the recess, the valleys being interspaced by a radially inwardly projecting tang, wherein a radially outer end of the clamp has a shape that corresponds to the contour of the recess, whereby the tang provides a circumferential constraint of the transition aft frame to the vane carrier structure.

2. The apparatus according to claim 1, wherein the angle is in the range of 3° to 10°.

3. The apparatus according to claim 1, wherein the spacer comprises an internal threading that engages with the radial retention bolt.

4. The apparatus according to claim 1, wherein the radial retention bolt is housed in a radial clearance hole provided in the vane carrier structure.

5. The apparatus according to claim 1, wherein the radial recess is formed on a forward face of the vane carrier structure facing a flow of a working medium.

6. The apparatus according to claim 1, wherein the clamp has a further end face that mates with a further wall of the recess, wherein the further end face comprises a protrusion that engages with a groove on the further wall of the recess.

7. A gas turbine engine comprising:
a combustor section for producing a working medium by combustion of a mixture of fuel and an oxidant,
a turbine section located downstream of the combustor section for expanding the working medium, and
a transition duct arranged fluidically between the combustor section and the turbine section, for directing the working medium from the combustor section to a first row of stationary vanes arranged on an annular vane carrier structure in the turbine section,
wherein the transition duct comprises a transition aft frame that engages with the vane carrier structure,
wherein vane carrier structure comprises a radial recess,
wherein the transition aft frame comprises an outwardly extending clamp that is at least partially inserted into the recess,
wherein a spacer is inserted into the recess whereby the clamp and the spacer are arranged axially adjacent to each other within the recess, wherein a first pair of mating surfaces is formed by a first end face of the spacer and an end face of the clamp and a second pair of mating surfaces is formed by a second end face of the spacer and a wall of the recess, wherein the first pair and/or second pair of mating surfaces are inclined at an angle with respect to a radial plane of the vane carrier structure,
wherein the spacer is secured to the vane carrier structure by a retention device, the retention device comprising a radial retention bolt configured to apply an axial load on the clamp when tightened,
wherein the recess has a circumferential contour that comprises at least a pair of valleys delimiting a radially outward extent of the recess, the valleys being interspaced by a radially inwardly projecting tang, wherein a radially outer end of the clamp has a shape that corresponds to the contour of the recess, whereby the tang provides a circumferential constraint of the transition aft frame to the vane carrier structure.

8. A method for attaching a transition duct to a turbine section of a gas turbine engine, comprising:
engaging a transition aft frame comprising an outwardly extending clamp with an annular shaped vane carrier structure, such that the clamp is at least partially inserted into a radial recess provided in the vane carrier structure,
inserting a spacer into the recess whereby the clamp and the spacer are arranged axially adjacent to each other within the recess, wherein a first pair of mating surfaces is formed by a first end face of the spacer and an end face of the clamp and a second pair of mating surfaces is formed by a second end face of the spacer and a wall of the recess, wherein the first pair and/or second pair of mating surfaces are inclined at an angle with respect to a radial plane of the vane carrier structure, and
securely fastening the spacer to the vane carrier structure via a radial retention bolt configured to apply an axial load on the clamp when tightened,
wherein the recess has a circumferential contour that comprises at least a pair of valleys delimiting a radially outward extent of the recess, the valleys being interspaced by a radially inwardly projecting tang, wherein a radially outer end of the clamp has a shape that corresponds to the contour of the recess, whereby the tang provides a circumferential constraint of the transition aft frame to the vane carrier structure.

9. The method according to claim 8, wherein the angle is in the range of 3° to 10°.

10. The method according to claim 8, wherein the spacer comprises an internal threading that engages with the radial retention bolt.

11. The method according to claim 8, wherein the radial retention bolt is housed in a radial clearance hole provided in the vane carrier structure.

12. The method according to claim 8, wherein the radial recess is formed on a forward face of the vane carrier structure facing a flow of a working medium.

13. The method according to claim 8, wherein the clamp is inserted into the recess such that a further end face of the clamp mates with a further wall of the recess, wherein the further end face comprises a protrusion that engages with a groove on the further wall of the recess.

14. The method according to claim 8, wherein the transition aft frame is assembled axially to the vane carrier structure to insert the clamp within the recess.

15. The method according to claim 8, wherein the spacer is inserted in a radial direction into the recess.

* * * * *